US012330280B2

(12) United States Patent
Baba et al.

(10) Patent No.: US 12,330,280 B2
(45) Date of Patent: Jun. 17, 2025

(54) DRIVING TOOL

(71) Applicant: MAKITA CORPORATION, Anjo (JP)

(72) Inventors: Norikazu Baba, Anjo (JP); Shun Kuriki, Anjo (JP); Kazusa Fukuda, Anjo (JP); Masaya Nagao, Anjo (JP)

(73) Assignee: MAKITA CORPORATION, Anjo (JP)

( * ) Notice: Subject to any disclaimer, the term of this patent is extended or adjusted under 35 U.S.C. 154(b) by 0 days.

(21) Appl. No.: 18/122,795

(22) Filed: Mar. 17, 2023

(65) Prior Publication Data

US 2023/0364761 A1 Nov. 16, 2023

(30) Foreign Application Priority Data

May 13, 2022 (JP) ................................ 2022-079287

(51) Int. Cl.
*B25C 1/04* (2006.01)

(52) U.S. Cl.
CPC .................................... *B25C 1/047* (2013.01)

(58) Field of Classification Search
CPC .................................. B25C 1/047; B25C 1/06
See application file for complete search history.

(56) References Cited

U.S. PATENT DOCUMENTS

2017/0190037 A1* 7/2017 Sato .......................... B25C 1/06
2018/0154505 A1 6/2018 Sato et al.
2019/0168366 A1* 6/2019 Yasutomi .................. B25C 1/06
2021/0031347 A1 2/2021 Sato et al.
2023/0321804 A1* 10/2023 Wang ...................... B25C 1/047
227/130

FOREIGN PATENT DOCUMENTS

JP 6485544 B2 3/2019

* cited by examiner

*Primary Examiner* — Thomas M Wittenschlaeger
(74) *Attorney, Agent, or Firm* — Oliff PLC

(57) ABSTRACT

A preceding engaging portion preceding a last engaging portion has a smaller diameter or is positioned further inward than the last engaging portion. Because of this configuration, an engagement of the preceding engaging portion with respect to a last engaged portion becomes more easily disengageable in comparison to the last engaging portions. When the preceding engaging portion disengages from the last engaged portion, the driver moves downward to a standby position. Accordingly, an engagement of the engaging portions with the engaged portions can be properly corrected, such that the last engaging portion engages the last engaged portion at the standby position.

19 Claims, 15 Drawing Sheets

DRIVING TOOL

CROSS-REFERENCE

This application claims priority to Japanese patent application serial number 2022-079287, filed on May 13, 2022, the contents of which are incorporated herein by reference in their entirety for all purposes.

TECHNICAL FIELD

The present invention generally relates to a driving tool for driving a material, such as a nail or a staple, into a workpiece, such as, for example, a wooden material.

BACKGROUND ART

For example, a gas-spring type driving tool that utilizes a thrust power of compressed air as a driving force is known. The gas-spring type driving tool may include a piston that moves in an up-down direction within a cylinder and a driver that is connected to the piston. The driver may move integrally with the piston in the up-down direction so as to drive a driving member. The piston and the driver may move downward in a driving direction owing to a pressure of the gas filled in an accumulation chamber. The piston and the driver may return in a direction opposite to the driving direction by a lift mechanism.

The lift mechanism may include a wheel that includes a plurality of engaging portions, each of which successively engages a corresponding engaged portion of a plurality of engaged portions of the driver. The wheel may be rotated by an electric motor. After a driving operation has been completed, each of the plurality of the engaging portions may successively engage a corresponding engaged portion of the driver by rotation of the wheel, thereby moving the driver upward. By the upward movement of the piston in the direction opposite to the driving direction, the gas pressure in the accumulation chamber may increase. When an engagement state of a latch mechanism with respect to the driver, after the driver has reached an upper end position, is released, the driver may move downward owing to the gas pressure in the accumulation chamber, thereby performing a driving operation.

In a lift mechanism of this type of driving tool, when the driver is stopped before reaching a lower end position owing to, for example, nail jamming, a relative position of an engaging portion of the wheel with respect to a corresponding engaged portion of the driver may sometimes deviate from a proper position. In such a deviated state, when the driver moves upward and reaches an upper end position before a next driving operation is to be performed, an operation of the driving tool may be unstable.

Thus, there is a need for a driving tool in which a deviation of an engagement of the driver with the wheel, if present, can be corrected so that a stable driving operation can be performed.

SUMMARY

According to one feature of the present disclosure, a driving tool comprises a piston configured to move in a driving direction owing to a pressure of a gas. The driving tool also comprises a driver configured to drive a driving member by moving integrally with the piston in the driving direction and a wheel configured to move the driver in a direction opposite to the driving direction. The driver, for example, includes a plurality of engaged portions arranged in a longitudinal direction of the driver. The wheel, for example, includes a plurality of engaging portions each of which is configured to successively engage one of the plurality of engaged portions when the wheel rotates to move the driver in the direction opposite to the driving direction.

Each engaging portion, for example, includes an outer area such that when each engaging portion engages one of the plurality of engaged portions, the outer area is positioned on a side facing the driver in a direction perpendicular to the driving direction. Furthermore, the outer area of a preceding engaging portion, which precedes a last engaging portion that is used to move the driver in the direction opposite to the driving direction, is positioned away from the driver in comparison to the outer areas of the other engaging portions.

Because of this configuration, when the driver moves in a direction opposite to the driving direction, an engagement of the preceding engaging portion with an engaged portion of the driver may be looser than an engagement of the engaging portion with the engaged portion. Accordingly, the preceding engaging portion more easily disengages from the engaged portion when the wheel rotates in the loose engagement state. As a result, a deviated engagement of the engaging portion with the engaged portion may be properly corrected, such that the last engaging portion engages the last engaged portion. After the deviated engagement has been corrected, the wheel may be stopped. In this manner, a next driving operation may be performed in a more stable manner.

According to another feature of the present disclosure, a driving tool comprises a piston configured to move in a driving direction owing to a pressure of a gas. The driving tool also comprises a driver configured to drive a driving member by moving integrally with the piston in the driving direction and a wheel configured to move the driver in a direction opposite to the driving direction. Furthermore, the driving tool further comprises a guide surface configured to slidably support the driver on a side of the driver opposite to the wheel. The driver, for example, includes a plurality of engaged portions arranged in a longitudinal direction of the driver. The plurality of engaged portions, for example, includes a last engaged portion that finally engages the wheel. The wheel, for example, includes a plurality of engaging portions, each of which is configured to successively engage one of the plurality of engaged portions, when the wheel rotates to move the driver in the direction opposite to the driving direction.

For example, the plurality of engaging portions include a preceding engaging portion preceding a last engaging portion. The preceding engaging portion and the last engaging portion are used to move the driver in the direction opposite to the driving direction. Furthermore, the guide surface, for example, includes a relief portion that allows the driver to move in a direction away from the wheel when the last engaged portion of the driver engages the preceding engaging portion of the wheel.

Because of this configuration, when the driver enters the relief portion, an engagement of the preceding engaging portion with an engaged portion of the driver may become relatively loose. Accordingly, the preceding engaging portion more easily disengages from the engaged portion when the wheel rotates in the loose engagement state. As a result, a deviated engagement of the engaging portion with the engaged portion may be properly corrected, such that the last engaging portion engages the last engaged portion. After the deviated engagement has been corrected, the wheel may be stopped. In this manner, a next driving operation may be performed in a more stable manner.

DETAILED DESCRIPTION

Figure 1:
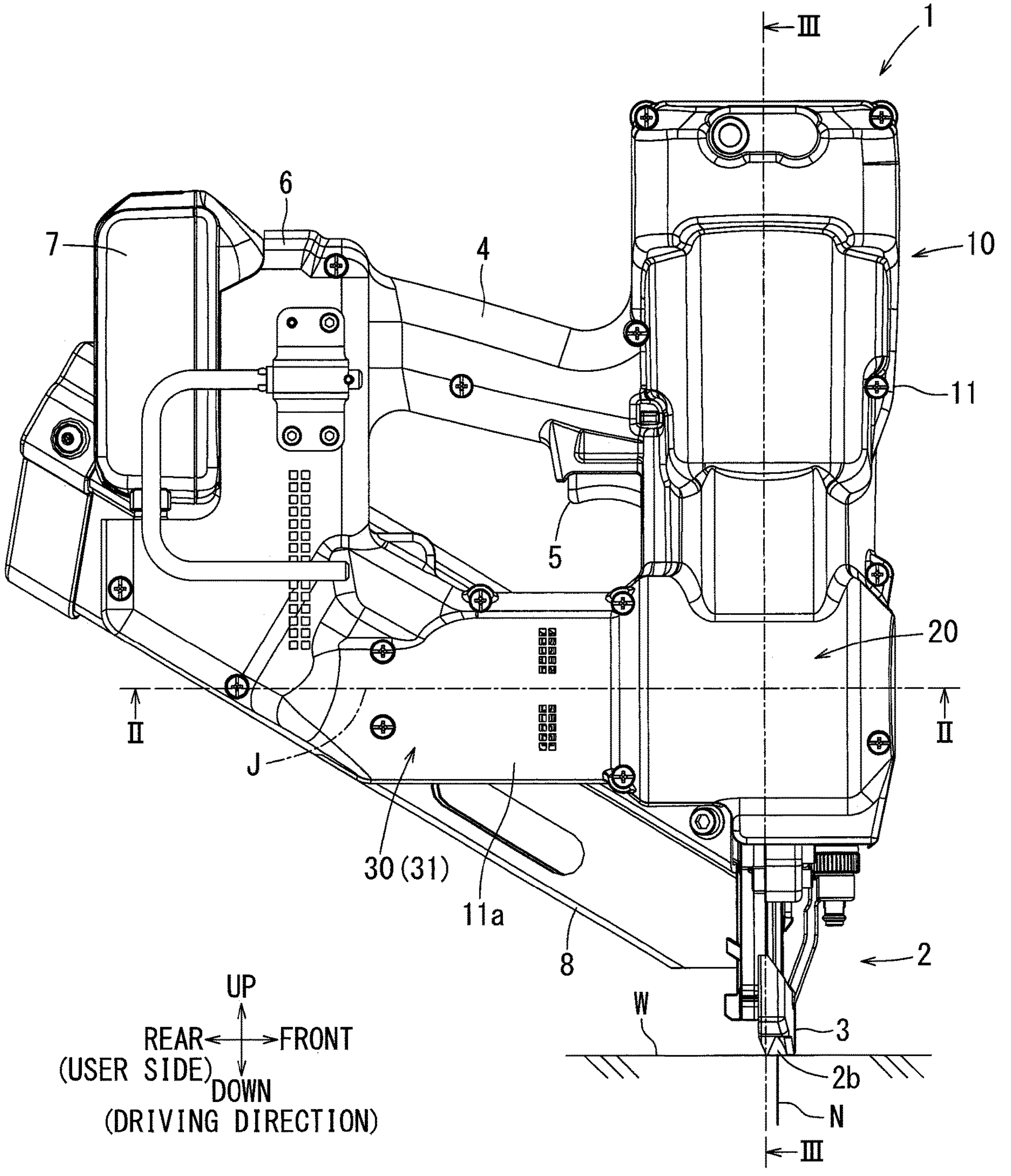
FIG. 1 is an overall right side view of a driving tool according to a first embodiment of the present disclosure.

The detailed description set forth below, when considered with the appended drawings, is intended to be a description of exemplary embodiments of the present disclosure and is not intended to be restrictive and/or to represent the only embodiments in which the present disclosure can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the disclosure. It will be apparent to those skilled in the art that the exemplary embodiments of the disclosure may be practiced without these specific details. In some instances, these specific details refer to well-known structures, components, and/or devices that are shown in block diagram form in order to avoid obscuring significant aspects of the exemplary embodiments presented herein.

According to a feature of the present disclosure, the preceding engaging portion may have a smaller diameter than the other engaging portions. Because of this configuration, the outer area of a preceding engaging portion preceding a last engaging portion is positioned away from the driver in comparison to those of the other engaging portions. As a result, an engagement of the preceding engaging portion with the engaged portion may be more easily released.

According to another feature of the present disclosure, the preceding engaging portion is nearer to a rotation center axis of the wheel than the other engaging portions. Because of this configuration, the outer area of a preceding engaging portion preceding a last engaging portion is positioned away from the driver in comparison to those of the other engaging portions. As a result, an engagement of the preceding engaging portion with the engaged portion may be more easily released.

According to another feature of the present disclosure, the plurality of engaged portions of the driver includes a last engaged portion that finally engages the wheel to move the driver upward. The driver, for example, is slidably supported by a guide surface located on a side of the driver opposite to the wheel. Furthermore, the guide surface includes a relief portion that allows the driver to move in a direction away from the wheel when the last engaged portion of the driver engages the preceding engaging portion of the wheel. When the driver enters the relief portion, an engagement of the preceding engaging portion with the last engaged portion may be disengageable. As a result, a deviated engagement of the wheel with the engaged portion of the driver may be corrected.

According to another feature of the present disclosure, the guide surface includes a main guide surface that extends in the driving direction. The relief portion is near to the main guide surface in the direction opposite to the driving direction and near to a standby position, in which the last engaging portion of the wheel engages the last engaged portion of the driver, of a tip end of the driver. Furthermore, the relief portion is recessed in a direction away from the wheel in comparison to the main guide surface. Accordingly, in a case where the driver moves above the standby position in a direction opposite to the driving direction, which is an improper state in which the last engaged portion of the driver engages the preceding engaging portion of the wheel, the driver may move away from the wheel when the driver enters the relief portion from the main guide surface. As a result, the preceding engaging portion disengages from the last engaged portion, thereby correcting the deviated engagement of the engaging portion with the engaged portion.

According to another feature of the present disclosure, the guide surface includes a tilt surface that is tilted with respect to the main guide surface and extends from the main guide surface to the relief surface. Because of this configuration, the driver may move between the main guide surface and the relief portion of the guide surface in a smooth manner, owing in part to the tilt surface of the guide surface.

According to another feature of the present disclosure, the driver includes a tip end that is configured to enter the relief portion. Furthermore, the tip end of the driver includes a tilt surface that is located on a side of the driver nearer the guide surface and that is tilted with respect to a direction in which the driver moves. Because of this configuration, the driver may move between the main guide surface and the relief portion of the guide surface in a smooth manner, owing in part to the tilt surface of the driver.

According to another feature of the present disclosure, when the preceding engaging portion of the wheel engages the last engaged portion of the driver, the driver moves to the relief portion to cause the preceding engaging portion to disengage from the last engaged portion. This allows the driver to move from the relief portion in the driving direction, thereby causing the driver to move to the standby position in which the last engaging portion of the wheel to engage the last engaged portion of the driver. Because of this configuration, a slide contact of the driver with the main guide surface may cause a firm engagement of the last engaging portion of the wheel with the last engaged portion, thereby reliably retaining the driver at the standby position.

According to another feature of the present disclosure, the plurality of engaged portions of the driver includes a last engaged portion that finally engages the last engaging portion of the wheel when the driver moves in the direction opposite to the driving direction. Furthermore, a length of the last engaged portion protrudes to a side of the wheel to a greater extent than the other engaged portions. Accordingly, an engagement of the wheel with the last engaged portion of the driver may become firm. As a result, the last engaging portion may properly and reliably engage the last engaged portion at the standby position.

Next, a first embodiment according to the present disclosure will be described with reference to FIGS. 1 to 16. FIG. 1 shows an example of a driving tool 1, e.g., a gas-spring type driving tool 1 that utilizes a pressure of a gas filled in a chamber above a cylinder 12 as a thrust power for driving a driving member N. In the following explanation, a driving direction of the driving member N is a downward direction, and a direction opposite to the driving direction is an upward direction. In FIG. 1, a user of the driving tool 1 may be generally situated on a rear side of the driving tool 1. The rear side of the driving tool 1 may be also referred to as a user side, and a side in a forward direction may be referred to as a front side. Also, a left and right side may be based on a user's position.

Figure 3:
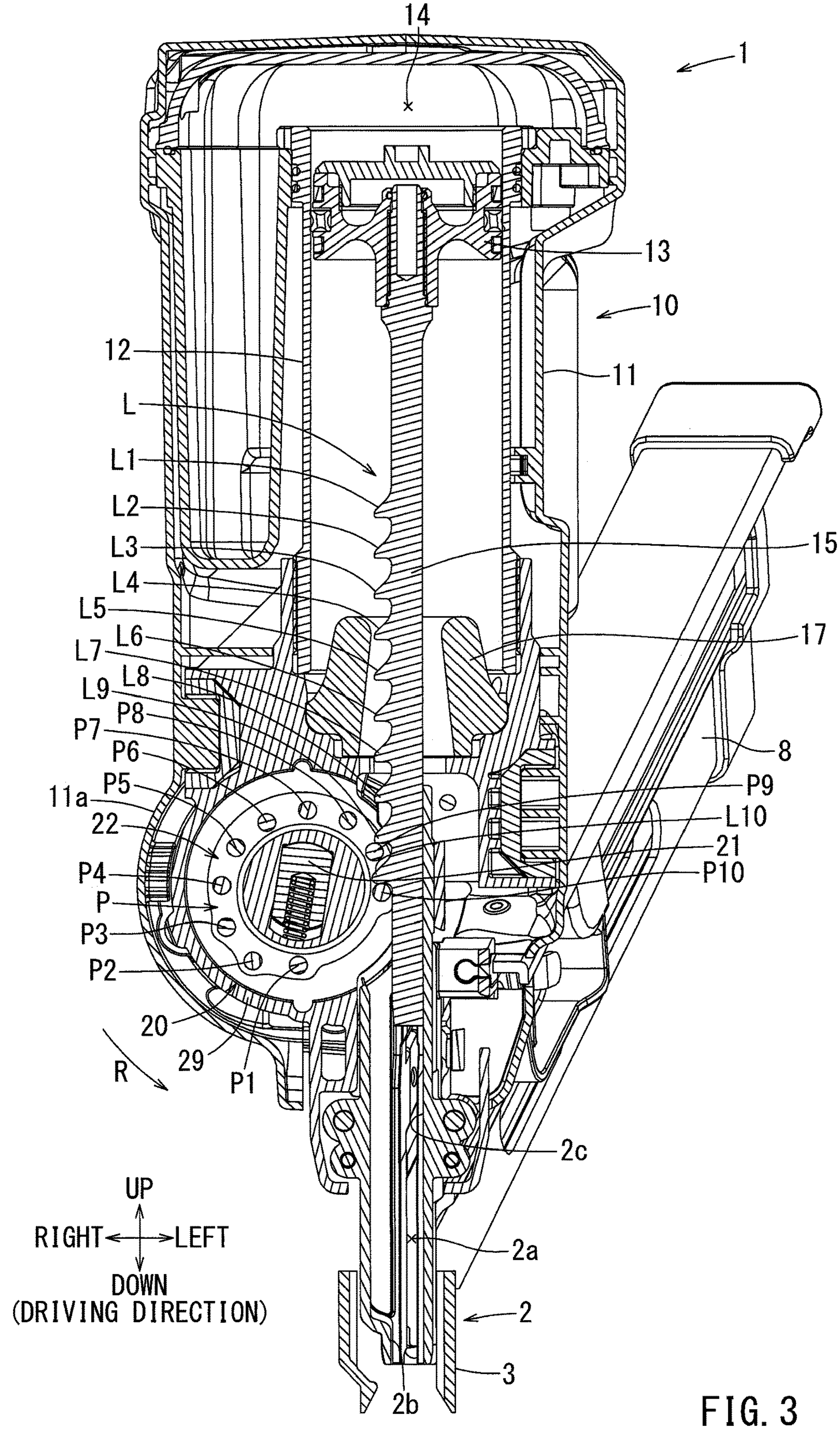
FIG. 3 is a cross-sectional view taken along line III-III of FIG. 1, showing a longitudinal cross-sectional view of a tool main body.

As shown in FIGS. 1 and 3, the driving tool 1 may include a tool main body 10. The tool main body 10 may be configured to include a cylinder 12 that is housed in a tubular main body housing 11. A piston 13 may be housed within the cylinder 12, so as to be able to be reciprocated in an up-down direction. An upper portion of the cylinder 12 that is above the piston 13 may communicate with an accumulation chamber 14. A compression gas such as, for example, air, may filled in the accumulation chamber 14. A pressure of a gas filled in the accumulation chamber 14 may act on an upper surface of the piston 13, thereby providing a thrust power for a driving operation.

As shown in FIG. 3, a lower portion of the cylinder 12 may communicate with a driving passage 2*a* of a driving nose 2. The driving nose 2 is provided at a lower portion of the tool main body 10. The driving nose 2 may be linked to a magazine 8 within which a plurality of driving members N (refer to FIG. 1) are loaded. The plurality of driving members N may be supplied from within the magazine 8 to the driving passage 2*a* one by one. A contact arm 3 may be arranged at a lower portion of the driving nose 2 so as to be slidable in the up-down direction. The contact arm 3 may move upward when the contact arm 3 is pressed against a workpiece W.

As shown in FIG. 3, a driver 15 may be connected to a lower portion of the piston 13. A lower portion of the driver 15 may enter a driving passage 2*a* of the driving nose 2. The driver 15 may move downward within the driving passage 2*a* owing to the pressure of the gas filled in the accumulation chamber 14, which is configured to act on the upper surface of the piston 13. The lower portion of the driver 15 may drive a driving member N that has been supplied to the driving passage 2*a*. The driving member N that is driven by the driver 15 may be ejected from an ejection port 2*b* of the driving nose 2. The driving member N that is ejected from the ejection port 2*b* may be driven into the workpiece W. A lower end damper 17 for absorbing an impact of the piston 13 may be disposed on a lower side of the cylinder 12.

As shown in FIG. 3, a plurality of engaged portions L may be formed on a right side of the driver 15. In the present disclosure, the plurality of engaged portions L may be formed in a rack teeth shape projecting in a direction toward the wheel 22 (right direction). In the present disclosure, ten engaged portions (L1-L10) may be arranged at specified intervals in a longitudinal direction of the driver 15 (in an up-down direction). In the following explanation, the ten engaged portions may be referred to as a first engaged portion L1, a second engaged portion L2, a third engaged portion L3, a fourth engaged portion L4, a fifth engaged portion L5, a sixth engaged portion L6, a seventh engaged portion L7, an eighth engaged portion L8, a ninth engaged portion L9, and a tenth engaged portion L10 in order from a top. Each of the ten engaged portions L may engage a corresponding engaging portion P arranged in a lift mechanism 20, discussed later in detail.

As shown in FIG. 1, a grip 4, which is configured to be held by a user, may be arranged on a rear side of the tool main body 10. A trigger 5, which is configured to be pulled by a fingertip of the user, may be arranged on a lower surface of a front portion of the grip 4. When the contact arm 3 is pushed against the workpiece W so as to be moved relatively upward with respect to the driving nose 2, a pull operation of the trigger may become effective. A battery attachment portion 6 may be arranged on a rear side of the grip 4. A battery pack 7 may be detachably attached to a rear surface of the battery attachment portion 6. The battery pack 7 may be removed from the battery portion 6 to be repeatedly recharged by a dedicated charger. The battery pack 7 may be used as a power source for various electric tools. The battery pack 7 may serve as a power source for supplying power to a driving unit 30, which is discussed in greater detail later.

As shown in FIG. 3, a lift mechanism 20 may be linked to a right side of the driving nose 2. The lift mechanism 20 may have a function of returning the driver 15, and accordingly the piston 13, upward after a driving operation has been completed. The pressure of the gas in the accumulation chamber 14 may increase owing to an upward movement of the piston 13 by the lift mechanism 20.

As shown in FIG. 1, the driving unit 30 for driving the lift mechanism 20 may be arranged on a rear side of the lift mechanism 20. The lift mechanism 20 and the driving unit 30 may be housed in approximately a tubular-shaped driving unit case 11*a*. The driving unit case 11*a* may link a lower portion of the main body housing 11 to a lower portion of the battery attachment portion 6. The driving unit case 11*a* may be integrally formed with the main body housing 11.

Figure 2:
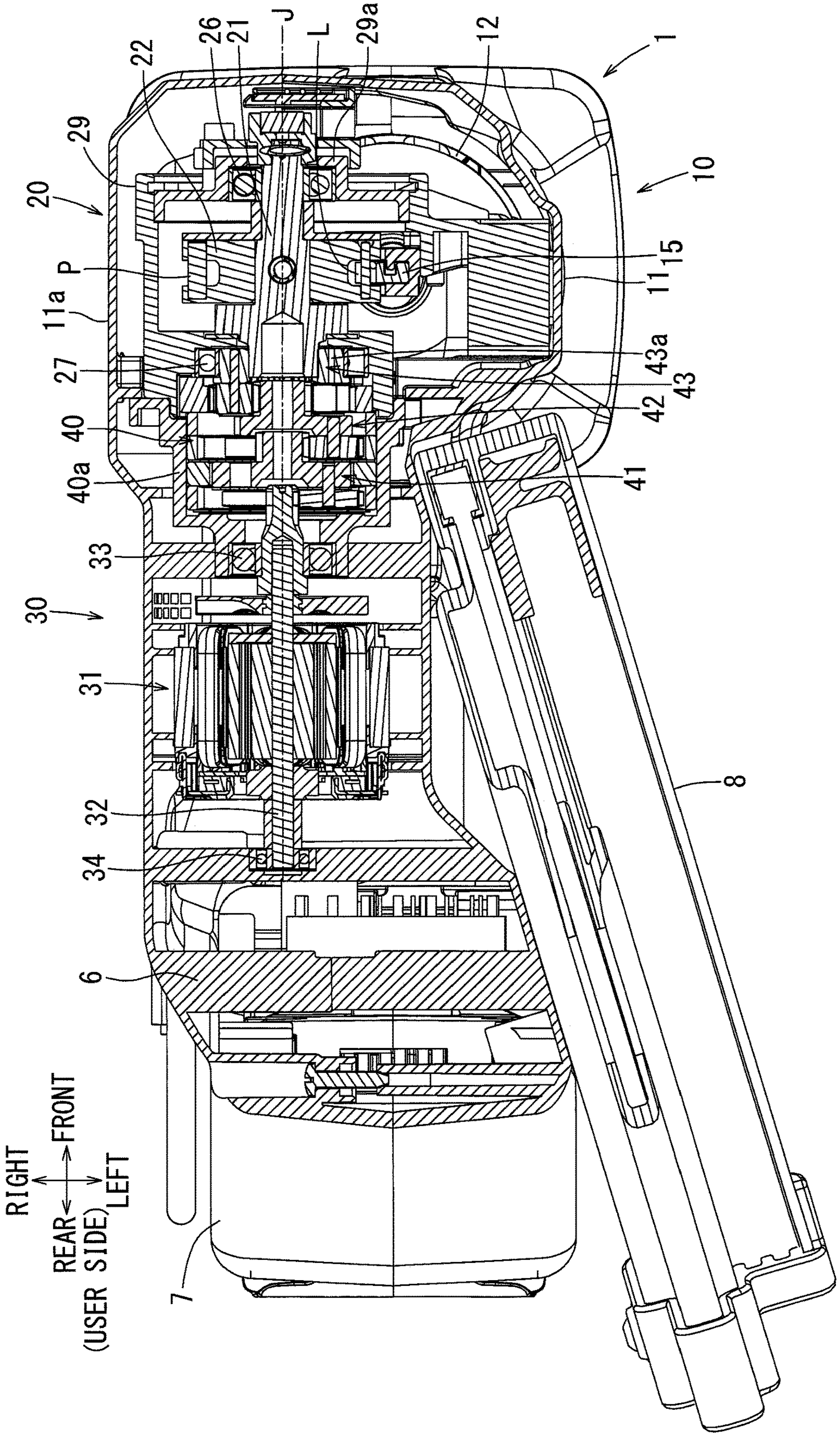
FIG. 2 is a cross-sectional view taken along line II-II of FIG. 1, showing a transversal cross-sectional view of a lift mechanism.

As shown in FIG. 2, the driving unit 30 may include an electric motor 31 serving as a driving source. The electric motor 31 may be housed in the driving unit case 11*a* such that an axis line of the output shaft 32 of the electric motor 31 (motor axis line J) extends in a front-rear direction perpendicular to a driving direction (a direction perpendicular to a paper surface of FIG. 2). The battery pack 7 may serve as a power source for the electric motor 31. The electric motor 31 may be activated by a pull operation of the trigger 5 or any other suitable operation.

As shown in FIG. 2, the output shaft 31 of the electric motor 31 may be rotatably supported by the driving unit case 11*a*, via bearings 33, 34. A front portion of the output shaft 32*a* may be connected to a reduction gear 40. The reduction gear 40 may be supported on an inner peripheral side of approximately a tubular-shaped gear case 40*a* that is housed in the driving unit case 11*a*. A first planet gear 41, a second planet gear 42, and a third planet gear 43 may be used for the reduction gear 40. The first to third planet gears 41, 42, 43 may be arranged coaxial to each other, and may be arranged coaxial with the motor axis line J. A rotation output of the electric motor 31 may be output to the lift mechanism 20, for instance, after being reduced by the reduction gear train 40, which may include the first to third planet gears 41, 42, 43.

As shown in FIG. 2, the lift mechanism 20 may include a rotation shaft 21 that is connected to the reduction gear 40. The lift mechanism 20 may also include a wheel 22 that is supported by the rotation shaft 21. The lift mechanism 20 may be housed in approximately a tubular-shaped mechanism case 29 that is housed in the driving unit case 11*a*. A rotation axis line of the rotation shaft 21 may be aligned with the motor axis line J. A front portion of the mechanism case 29 may be covered with a cover 29*a*. A front end of the rotation shaft 21 may be rotatably supported by a bearing 26 that is held by the mechanism case 29 via the cover 29*a*. A rear end of the rotation shaft 21 may be linked to a final stage carrier 43*a* of the reduction gear 40. The final stage carrier 43*a* of the reduction gear 40 may be rotatably supported by the mechanism case 29 via a bearing 27 that is arranged on an outer periphery side of the final stage carrier 43*a*. When the electric motor 31 is activated, the rotation shaft 21 and the wheel 22 of the lift mechanism 20 may integrally rotate in a direction indicated by an arrow R in FIG. 3 (in a counterclockwise direction in FIG. 3). The driver 15 may move upward by the rotation of the wheel 22 in the direction indicated by the arrow R.

As shown in FIG. 3, the wheel 22 may include a plurality of engaging portions P, each of which is configured to successively engage a corresponding engaged portion L of the driver 15. The plurality of engaging portions P may be arranged at specified intervals along an outer periphery of the wheel 22. In the present embodiment, for example, the wheel 22 may include ten engaging portions P (P1 to P10). A cylindrical shaft member (e.g., a pin) may be used for each of the plurality of engaging portions P. In the following explanation, ten engaging portions P may be referred to as a first engaging portion P1, a second engaging portion P2, a third engaging portion P3, a fourth engaging portion P4, a fifth engaging portion P5, a sixth engaging portion P6, a seventh engaging portion P7, an eighth engaging portion P8, a ninth engaging portion P9, and a tenth engaging portion P10 in order from a forward side in the rotation direction indicated by the arrow R in FIG. 3.

Figure 4:
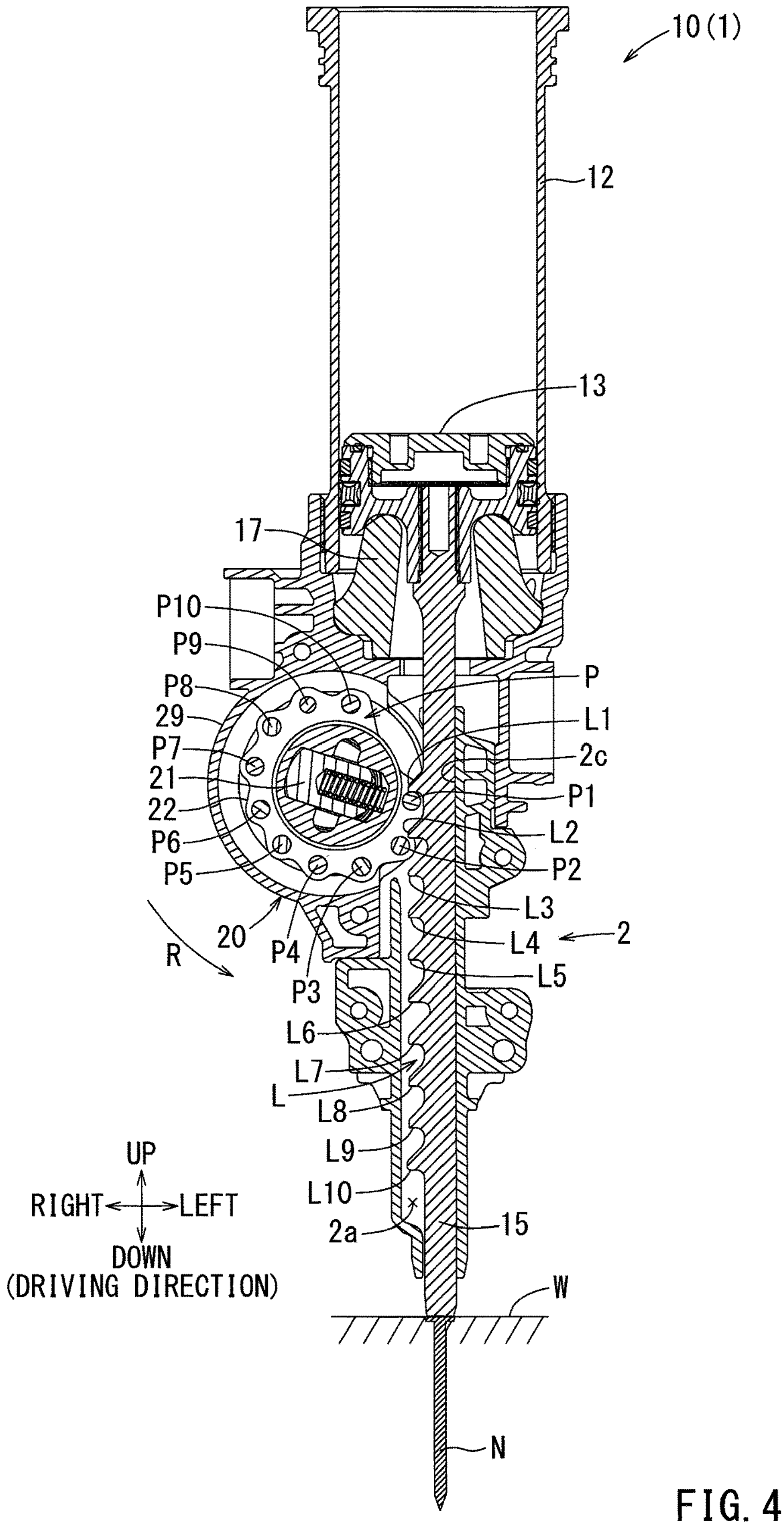
FIG. 4 is a longitudinal cross-sectional view of the lift mechanism, showing a state in which a driver starts to move upward after a driving operation has been performed.

FIG. 4 shows a state in which the driver 15 starts to move upward after the driver 15 has moved to a lower end position to drive a driving member N. A driving operation may be properly performed when the driver 15 moves to the lower end position. The driver 15 may move downward until the piston 13 contacts (and sometimes slightly compresses) the lower end damper 17 owing to the pressure of the gas in the accumulator chamber 14, thereby properly performing a driving operation. After the driver 15 has reached the lower end position, the wheel 22 may continue to rotate in the direction indicated by the arrow R such that the driver 15 may be returned upward. As shown in FIG. 4, the driver 15 may start to move upward when the first engaging portion P1 of the wheel 22 properly engages a lower surface of the first engaged portion L1 of the driver 15. An engagement of an engaging portion P with a corresponding engaged portion L may be performed properly when the engaging portion P engages the engaged portion L assigned with the same number as the engaging portion P. In a case where an engaging portion P does not engage the engaged portion L assigned with the same number as the engaging portion P, an engagement of the engaging portion P with the engaged portion L may not be properly performed. In such a case, the engaging portion P may engage the engaged portion L in a deviated manner. However, in some situations, an engaging portion P may engage an engaged portion L assigned a different number, some examples of which will be discussed later in detail.

Normally, the wheel 22 may continue to rotate in the direction indicated by the arrow R while the first engaging portion P1 engages the first engaged portion L1. Then, the second engaging portion P2 may engage a lower surface of the second engaged portion L2. Next, the third engaging portion P3 may engage a lower surface of the third engaged portion L3. According to the rotational position of the wheel 22, the fourth engagement portion P4, the fifth engagement portion P5, the sixth engagement portion P6, the seventh engagement portion P7, the eighth engagement portion P8, the ninth engagement portion P9, and the tenth engagement portion P10 may engage a lower surface of the fourth engaged portion L4, the fifth engaged portion L5, the sixth engaged portion L6, the seventh engaged portion L7, the eighth engaged portion L8, the ninth engaged portion L9, and the tenth engaged portion L10, respectively and in a successive manner. Because of this successive engagement of the engagement portions P with the corresponding engaged portions L, the driver 15 and the piston 13 may move upward.

Figure 5:
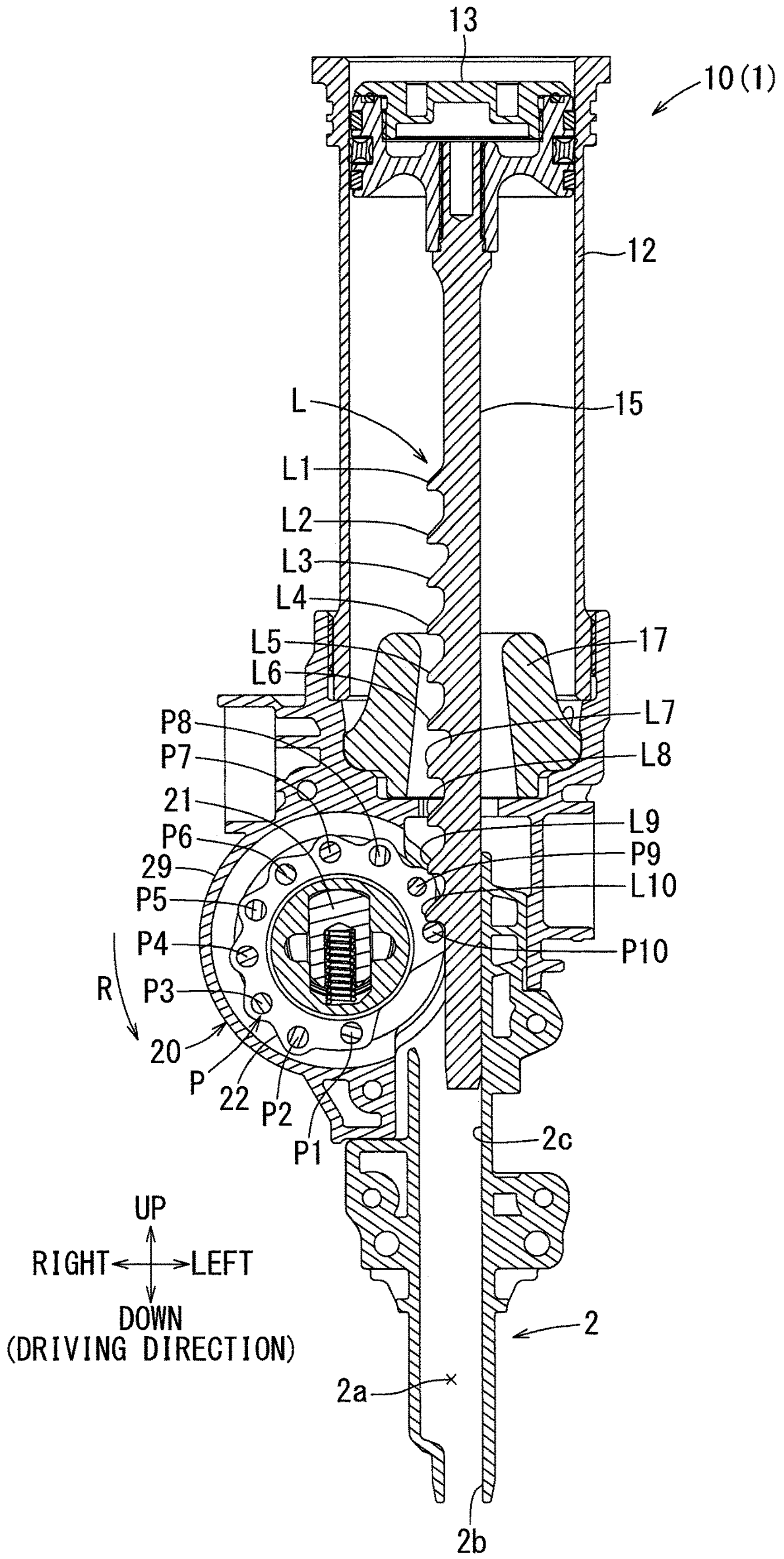
FIG. 5 is a longitudinal cross-sectional view of the lift mechanism, showing a state in which the driver is at a standby state.

As shown in FIG. 5, when the tenth engaging portion P10 engages a lower surface of the tenth engaged portion L10, the piston 13 and the driver 15 may reach a standby state. When the driver 15 and the piston 13 reach the standby state, the electric motor 31 may stop. This may be done, for example, by properly controlling an amount of time that has passed since activation of the electric motor 31. A sequence of the driving operation may be completed when the piston 13 and the driver 15 return to the standby state. A standby position of the piston 13 and the driver 15 may be positioned slightly below an upper end position of the piston 13 and the driver 15. A driving operation may be performed after the driver 15 moves upward from the standby state to or near the upper end position and then moves downward owing to a pressure of the gas in the accumulation chamber 14.

Figure 6:
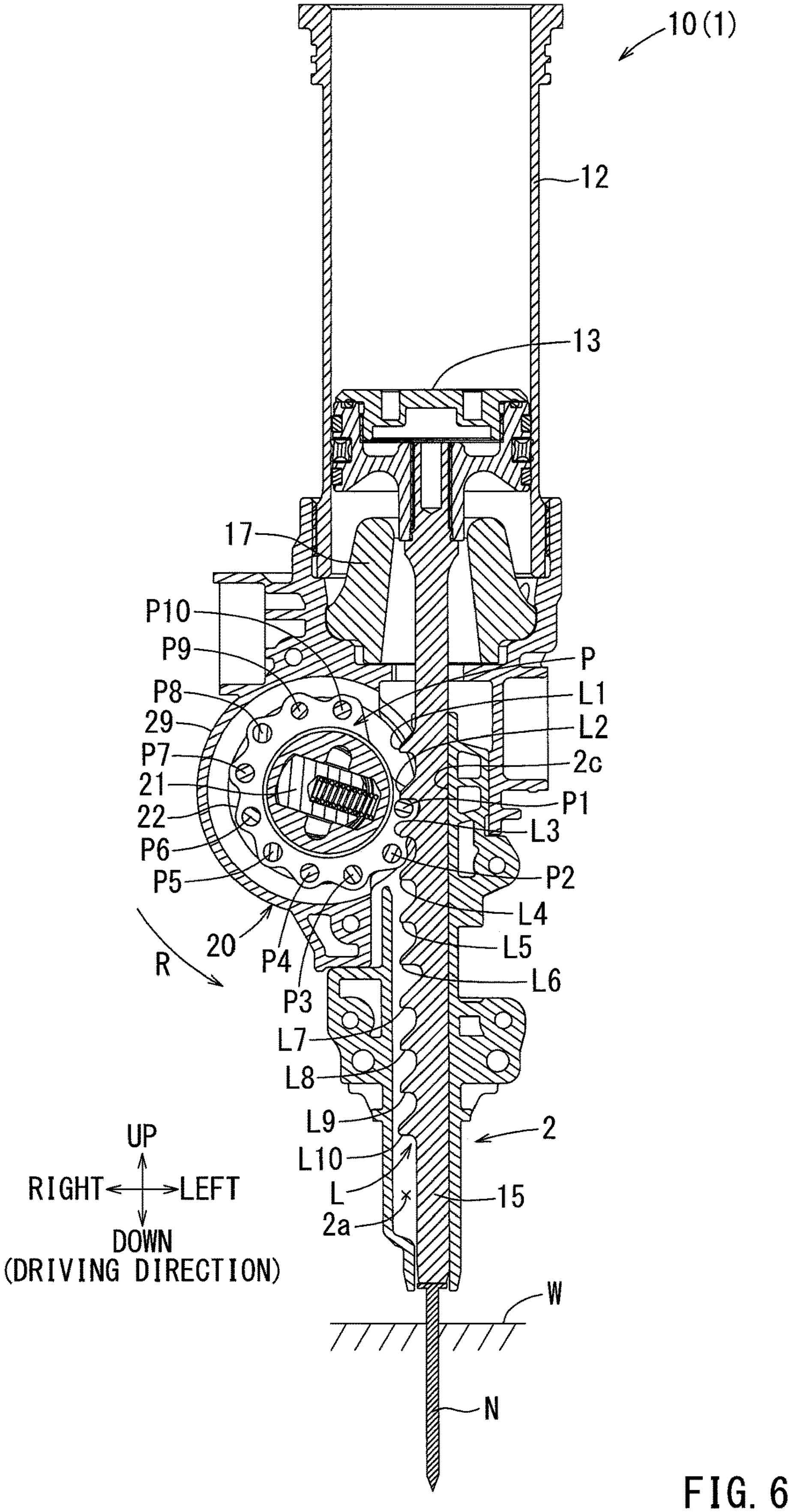
FIG. 6 is a longitudinal cross-sectional view of the lift mechanism, showing a state in which the driver has stopped during a downward movement. This figure shows that an engagement position of the driver with the wheel deviates from a proper position.

As shown in FIG. 6, when a driving member N is driven into, for example, a hard workpiece W, the driving member N may not be sufficiently driven into the workpiece W. In such a case, the piston 13 and the driver 15 may not reach the lower end position and instead may stop above the lower end position. In another case, for example, when a jam of the driving member N occurs, the piston 13 and the driver 15 may stop above the lower end position. FIG. 6 shows that the piston 13 stops above the lower damper 17. Other situations may also cause the piston 13 and the driver 15 to stop above the lower end position. Even if the driver 15 stops during its downward movement, the wheel 22 may continue to rotate. Because of this, a relative positional deviation (shift) of the engaging portions P with respect to the corresponding engaged portions L may occur, which may not occur in a normal driving operation. FIG. 6 shows that the first engaging portion P1 does not engage a lower surface of the first engaged portion L1, but instead engages a lower surface of the second engaged portion L2. That is, in this situation, an engaging portion P has engaged an engaged portion L assigned a different number. If a normal engagement had occurred, an example of which is shown in FIG. 4, when the wheel 22 starts to rotate, the first engaging portion P1 would have engaged a lower surface of the first engaged portion L1. Contrary to this, FIG. 6 shows an improper (abnormal) engagement state in which a relative positional deviation (shift) of the plurality of engaging portions P with respect to the plurality of engaged portions L occurs (an engagement of the engaging portions P with the engaged portions L is deviated/shifted by one).

Figure 7:
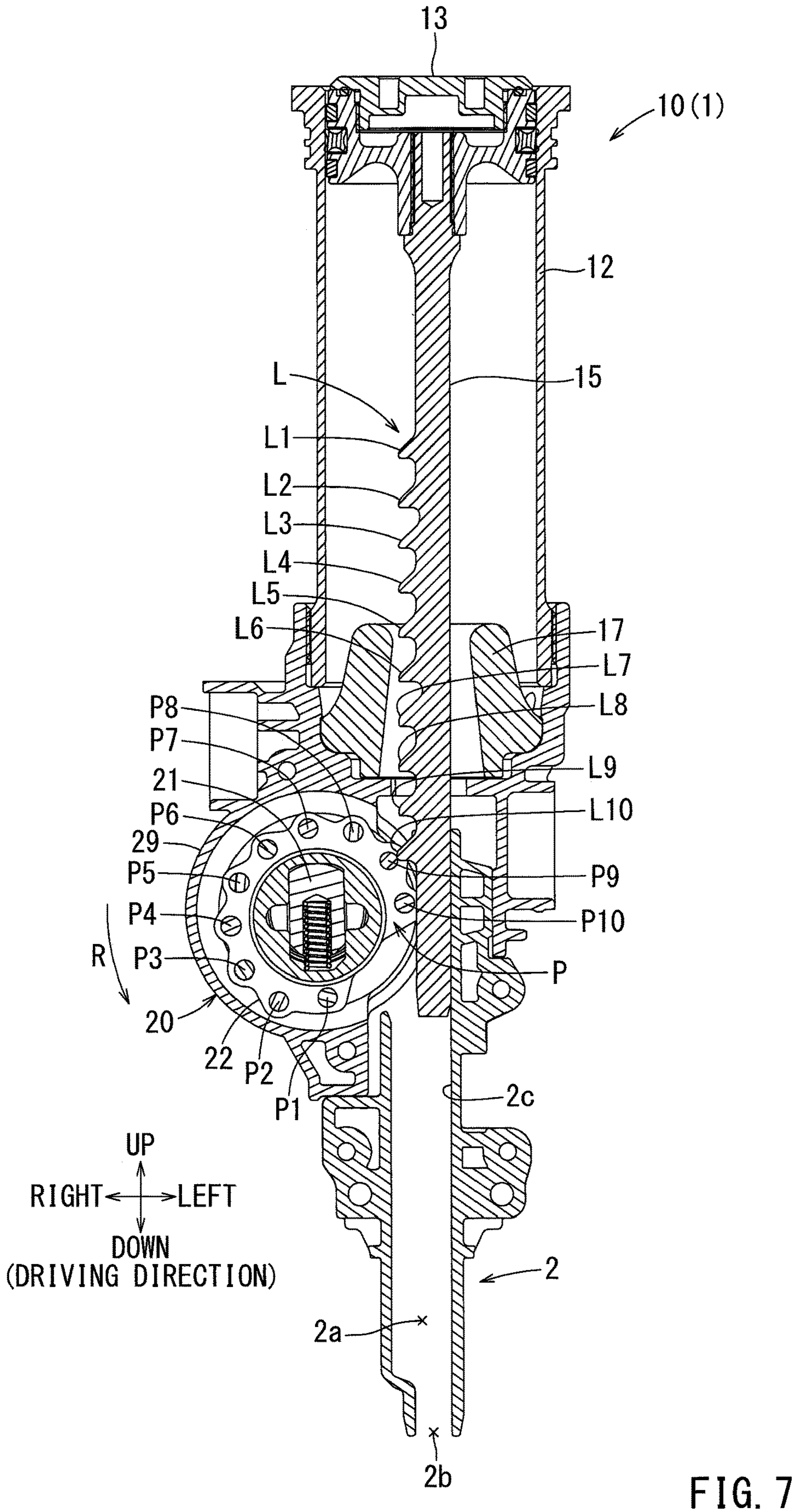
FIG. 7 is a longitudinal cross-sectional view of the lift mechanism, showing that the driver reaches an upper end position in a state in which the driver engages the wheel in a deviated manner.

Even in the above improper engagement state in which an engagement of the engaging portions P with the engaged portions L is deviated (shifted) by one, the wheel 22 may continue to rotate such that the driver 15 continues to move upward. Because of this, for example, as shown in FIG. 7, the ninth engaging portion P9 may engage a lower surface of the tenth engaged portion of L10, which causes the piston 13 and the driver 15 to move upward toward the upper end position as the wheel 22 continues to rotate. If the electric motor 31 stops to complete a sequence of the driving operation with a state in which the ninth engaging portion P9 of the wheel 22 engages a lower surface of the tenth engaged portion L10 of the driver 15, there is a possibility that a next driving operation becomes unstable. This could be because the tenth engaging portion P10 may interfere with the tenth engaged portion L10 of the driver 15 as it moves downward. In the present embodiment, this phenomenon may be avoided.

Figure 8:
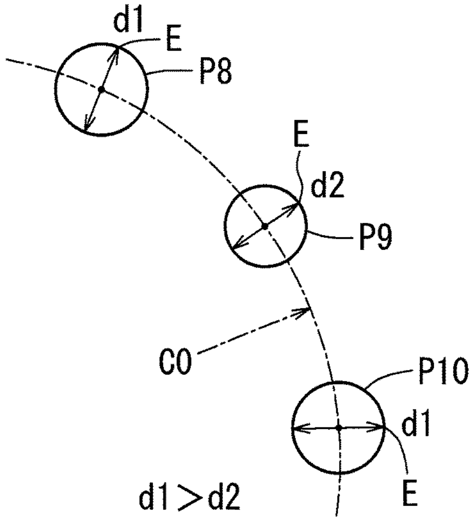
FIG. 8 is a view showing a difference in diameter and a positional relationship between an eighth engaging portion, an ninth engaging portion, and a tenth engaging portion.

In the first embodiment, the first engaging portion P1 to the tenth engaging portion P10 may be arranged such that each center of the first to tenth engaging portions P1-P10 is positioned on the same radius C0 centering around a center axis of the wheel 22 (hereinafter, an arc having a radius C0 may be referred to as a reference circle C0). FIG. 8 shows the eighth engaging portion P8 to the tenth engaging portion P10. As shown in FIG. 8, in the first embodiment, a diameter d2 of the ninth engaging portion P9 may be configured to be smaller than a diameter d1 of the other engaging portions P (the first engaging portion P1 to the eighth engaging portion P8 and the tenth engaging portion P10). Because of this configuration, as shown in FIG. 8, an outer area E of the ninth engaging portion P9 (an area E on the side of the driver 15 in a direction perpendicular to the driving direction) may be positioned relatively away from the driver 15 in comparison to the outer portions E of the other engaging portions P. The outer area E of the engaging portions P may also be considered to be an outer periphery side area of the wheel 22 in a radial direction of the wheel 22.

As discussed above, the outer area E of the ninth engaging portion P9 may be positioned away from the driver 15 in comparison to at least some of the other engaging portions P. Accordingly, the ninth engaging portion P9 may be configured to more weakly engage an engaged portion L in comparison to the other engaging portions P. Because of this configuration, when the driver 15 moves upward above the standby position while in the above-mentioned improper (deviated) engagement state, the ninth engaging portion P9 may disengage from the tenth engaged portion L10 in a shorter period of time. This disengagement of the ninth engaging portion P9 from the tenth engaged portion L10 during an upward movement of the piston 13 near to the upper end position may cause the piston 13 and the driver 15 to move downward to the standby position owing to a pressure of the gas in the accumulation chamber 14. Because of this movement, the tenth engaging portion P10 may engage a lower surface of the tenth engaged portion L10. In this manner, a relative positional deviation (shift) of the engaging portions P with respect to the engaged portions L may be corrected, and the driver 15 may be returned to the standby state as shown in FIG. 5.

Figure 9:
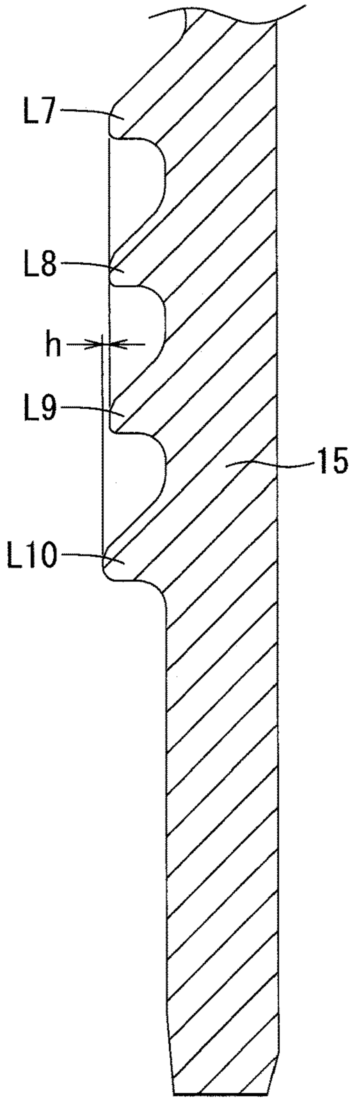
FIG. 9 is an enlarged view of a tip end of the driver.

In the present embodiment, as shown in FIG. 9, a tooth height of the tenth engaged portion L10 (a protruding length toward the wheel 22) may be configured to be larger than that of the other engaged portions L (the first engaged portion L1 to the ninth engaged portion L9) by a length h. Because of this configuration, an engagement of the tenth engaging portion P10 with the engaged portion L10 may be firm, such that the driver 15 may be more reliably retained at the standby position.

According to the embodiment discussed above, a diameter of the ninth engaging portion P9 of the wheel 22 may be configured to be smaller than that of the other engaging portions P (d1>d2). Accordingly, an outer area E of the ninth engaging portion P9 may be positioned further away from the driver 15 in comparison to those of the other engaging portions P. Because of this configuration, when the driver 15 moves in a direction opposite to the driving direction, the ninth engaging portion P9 more easily or more quickly disengages from the engaged portion L of the driver 15 in comparison to the other engaging portions P. By rotation of the wheel 22 with this weaker engagement, the ninth engaging portion P9 may disengage from the engaged portion L10 as the wheel 22 moves to the standby position. Because of this configuration, the driver 15 may be avoided from being stopped while the ninth engaging portion P9 engages the tenth engaged portion L10 of the driver 15 while the wheel 22 is in the standby position. For instance, a leftmost portion (a portion nearest the driver 15) of the ninth engaging portion P9 is positioned further rightward than a rightmost portion of the tenth engaged portion L10 when the wheel 22 is in the standby position. As another example, no portion of the ninth engaging portion P9 directly overlaps a portion of the tenth engaged portion L10 when the wheel 22 is in the standby position. Accordingly, a relative positional deviation (shift) of the engaging portions P of the wheel 22 with respect to the engaged portions L of the driver 15 at the standby position may be corrected. A next driving operation may be performed in a state in which such a relative positional deviation (shift) has been corrected. As a result, a driving operation may be performed in a more stable manner.

The embodiment discussed above may be modified in various way. In the above-exemplified embodiment, a diameter of the ninth engaging portion P9 may be configured to be smaller than that of the other engaging portions P (d1>d2)

such that an outer area E of the ninth engaging portion P9 is positioned away from the driver 15 in comparison to those of the other engaging portions P. This allows the ninth engaging portion P9 to more loosely engage the engaged portion L. However, a similar effect may be obtained by shifting a position of the ninth engaging portion P9, which will be explained in detail below.

Figure 10:
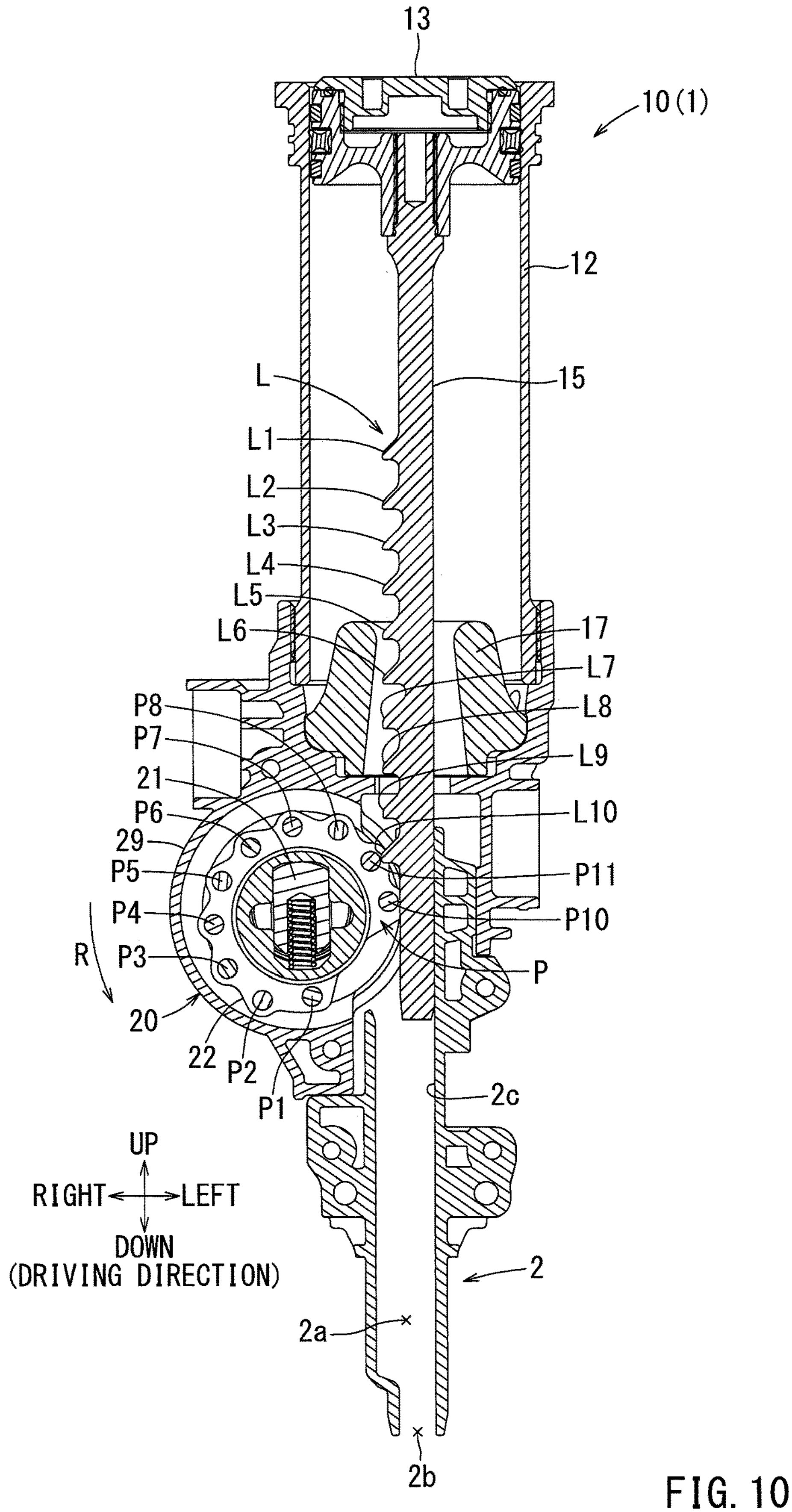
FIG. 10 is a longitudinal cross-sectional view of a lift mechanism according to a second embodiment of the present disclosure. This figure shows that the driver reaches an upper end position in a state in which the driver engages the wheel in a deviated manner.
Figure 11:
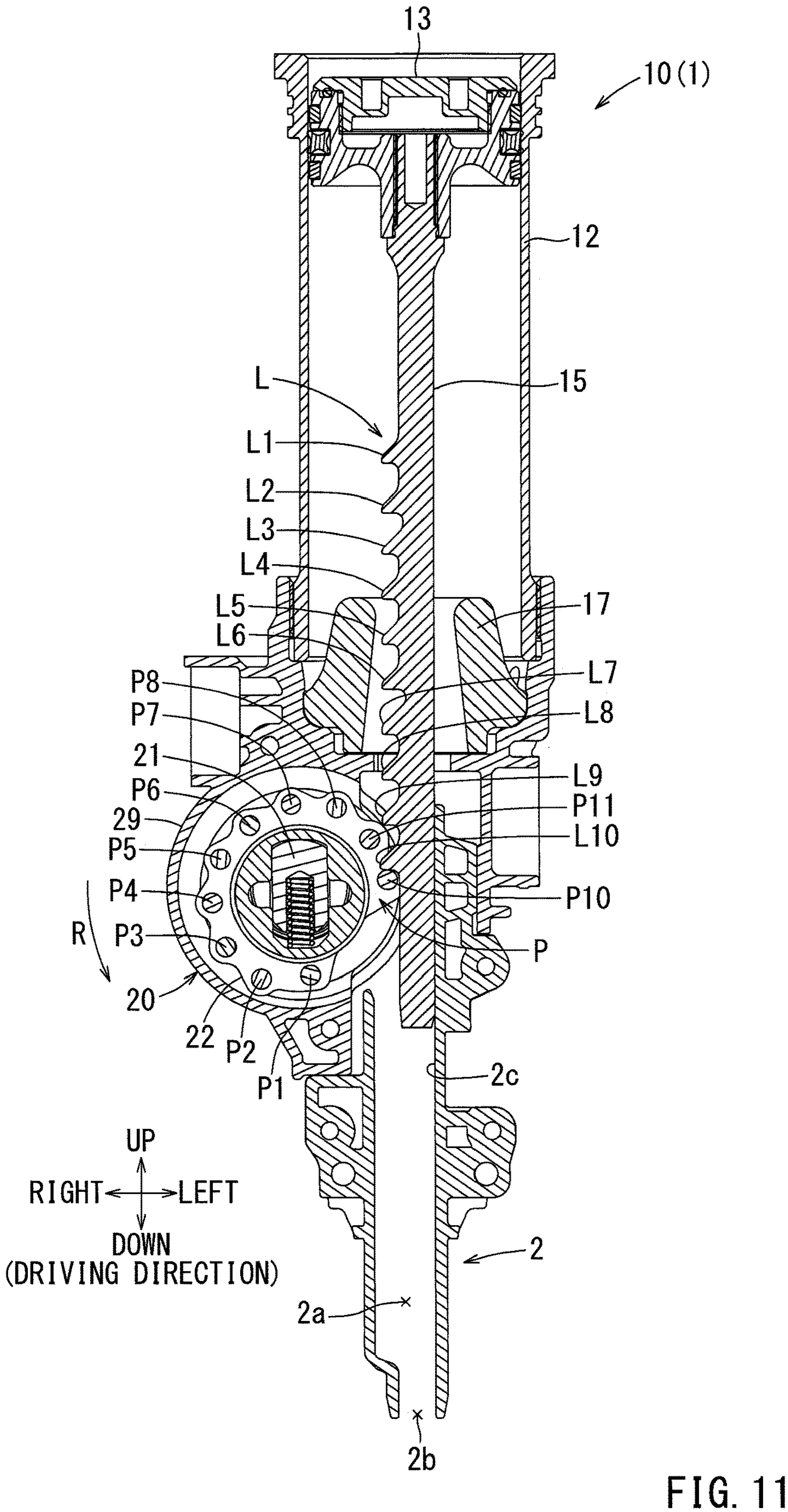
FIG. 11 is a longitudinal cross-sectional view of the lift mechanism according to the second embodiment. This figure shows that the driver is at a standby position after a deviation of the engagement of the driver with the wheel has been corrected.
Figure 12:
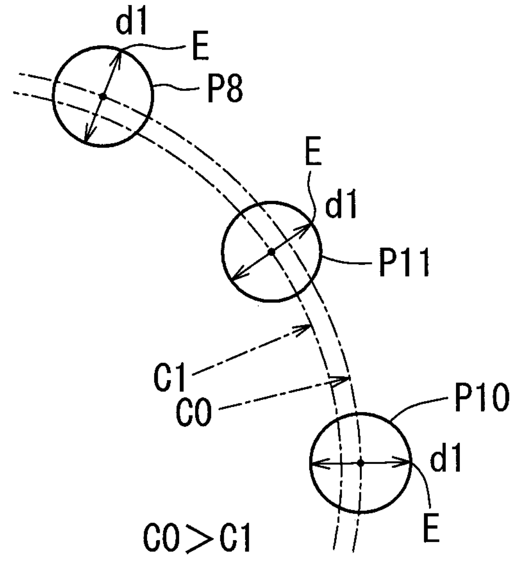
FIG. 12 is a view showing a positional relationship between an eighth engaging portion, an ninth engaging portion, and a tenth engaging portion according to the second embodiment.

FIGS. 10 to 12 show a ninth engaging portion P11 according to a second embodiment of the present disclosure. Descriptions of the members and configurations that do not need to be substantially modified and are in common with the first and second embodiments are omitted by use of the same reference numerals. In the second embodiment, a ninth engaging portion P11 may be used instead of the ninth engaging portion P9 of the first embodiment. In the second embodiment, a cylindrical shaft members (pins) with the same diameter d1 may be used for the first engaging portion P1 to the eighth engaging portion P8, the tenth engaging portion P10, and the ninth engaging portion P11. In the second embodiment, a proper (normal) engagement may be performed when the ninth engaging portion P11 engages a lower surface of the ninth engaged portion L9. With regard to the first engaging portion P1 to the eighth engaging portion P8 and the tenth engaging portion P10, similar to the first embodiment, when the engaging portion P engages the engaged portion L assigned with the same number as the engaging portion P, a proper (normal) engagement may be performed. However, in some cases, the engaging portion P may not engage the engaged portion L assigned with the same number as the engaging portion P.

As shown in FIG. 12, the ninth engaging portion P11 may be arranged on a second reference circle C1 (hereinafter, an arc having a radius C1 may be referred to as a second reference circle C1). The first engaging portion P1 to the eighth engaging portion P8 and the tenth engaging portion P10 may be arranged on the same reference circle C0 as the first embodiment. The radius of the second reference circle C1 may be configured to be smaller than the radius of the first reference circle C0 (C0>C1). Furthermore, as shown in FIG. 12, all engaging portions P of the wheel 22 may be configured to have the same diameter d1. Accordingly, the ninth engaging portion P11 may be arranged to be nearer to a rotation center axis of the wheel 22 (rotation center axis of the rotation shaft 21) than the other engaging portions P. Because of this configuration, an outer area E of the ninth engaging portion P11 may be positioned further away from the driver 15 in comparison to those outer areas E of the other engaging portions P. Accordingly, similar to the first embodiment, the ninth engaging portion P11 may more quickly disengage from or may more loosely engage with the engaged portion L in comparison to the other engaging portions P.

As shown in FIG. 10, when the driver 15 moves upward above the standby position to near the upper end position in an improper (deviated) engagement state, the ninth engaging portion P11 may disengage from the tenth engaging portion L10 by rotation of the wheel 22. Because of this, as shown in FIG. 11, the driver 15 may move downward such that the tenth engaging portion P10 may engage a lower surface of the tenth engaged portion L10, thereby returning the system to a normal (proper) engagement state. After that, rotation of the wheel 22 may be stopped. In this manner, the driver 15 may stop at the standby position in a state in which a relative positional deviation (shift) of the engaging portions P with respect to the engaged portions L has been corrected. As a result, a next driving operation may be performed in a more stable manner. Furthermore, in the second embodiment, a protruding length of the tenth engaged portion L10 may be configured to be larger than that of the other engaged portions L by a length h. Because of this configuration, an engagement of the tenth engaging portion P10 with the engaged portion L10 may be firm, such that the driver 15 may be more reliably retained at the standby position.

In the above first and second embodiments, a configuration in which an outer area E of the ninth engaging portions P9, P11 may be positioned away from the driver 15 in comparison to those of the other engaging portions P in order to correct a relative positional deviation (shift) of the engaging portions P of the wheel 22 with respect to the engaged portions L of the driver 15. A similar effect may be obtained according to a third embodiment discussed below.

FIGS. 13 to 16 shows the third embodiment of the present disclosure. In the third embodiment, a position of the driver 15 may be shifted to cause an engaging portion P of the wheel 22 to disengage from an engaged portion L of the driver 15, thereby correcting an improper (abnormal) engagement. In the third embodiment, a configuration of a guide surface 2*c* for guiding the driver 15, which has not been adopted in a prior art, may be formed in the driving passage 2*a*.

Figure 13:
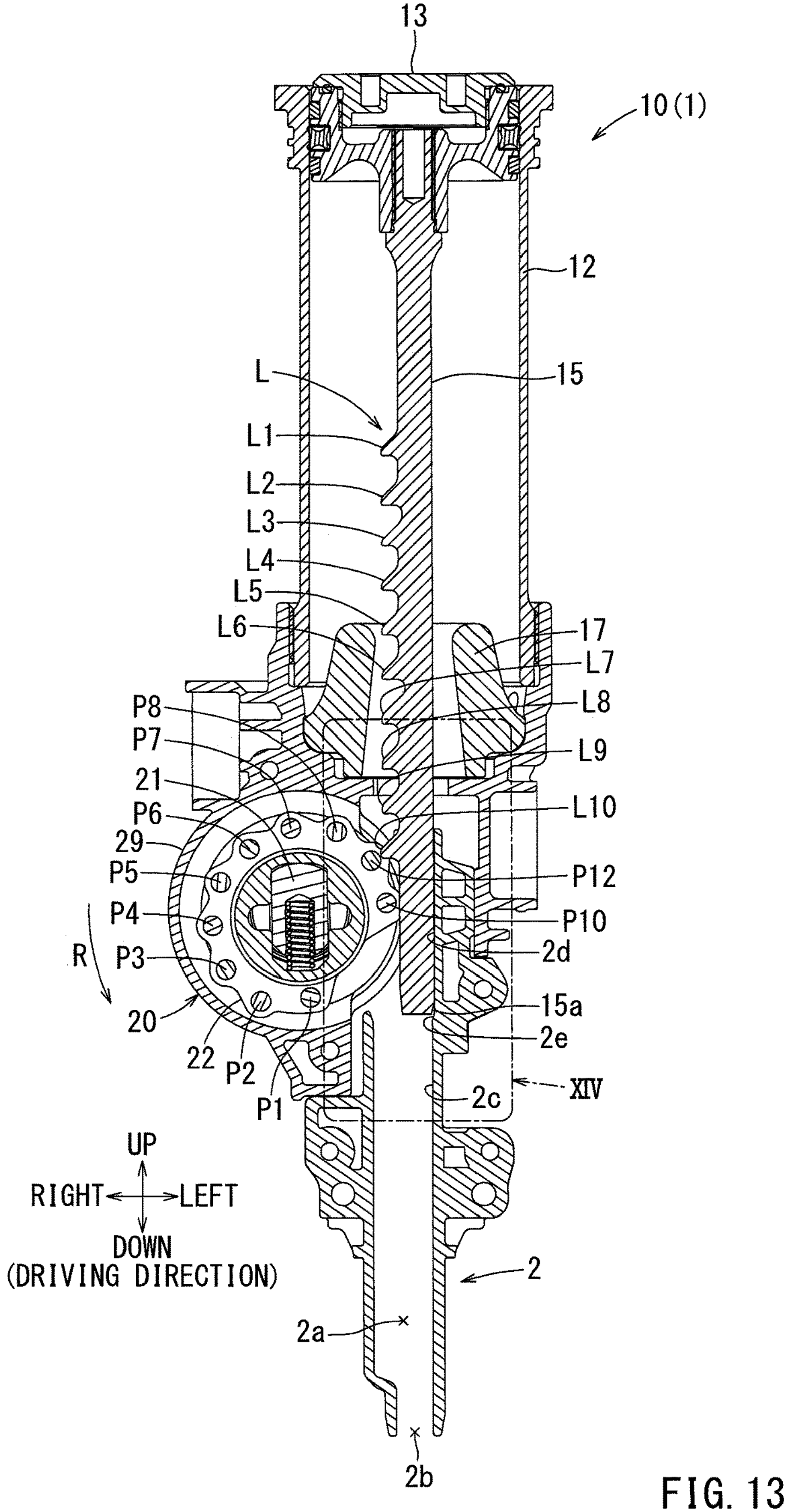
FIG. 13 is a longitudinal cross-sectional view of a lift mechanism according to a third embodiment of the present disclosure. This figure shows that the driver reaches an upper end position in a state in which the driver engages the wheel in a deviated manner.

As shown in FIG. 13, the guide surface 2*c* for guiding the driver 15 in an up-down direction may be formed in the driving passage 2*a*. The guide surface 2*c* may extend in the up-down direction on a side of the driver 15 away from the wheel 22. In an upward movement of the driver 15, a left side of the driver 15, which is a side of the diver 15 on an opposite side from the engaged portions L, mainly may slidably contact the guide surface 2*c* as the driver 15 moves upward.

When the engaging portion P of the wheel 22 engages the corresponding engaged portion L of the driver 15, a force in a direction toward the guide surface 2*c* may be applied to the driver 15. Because of this, the driver 15 may be guided to move upward while being pushed against the guide surface 2*c*.

Figure 14:
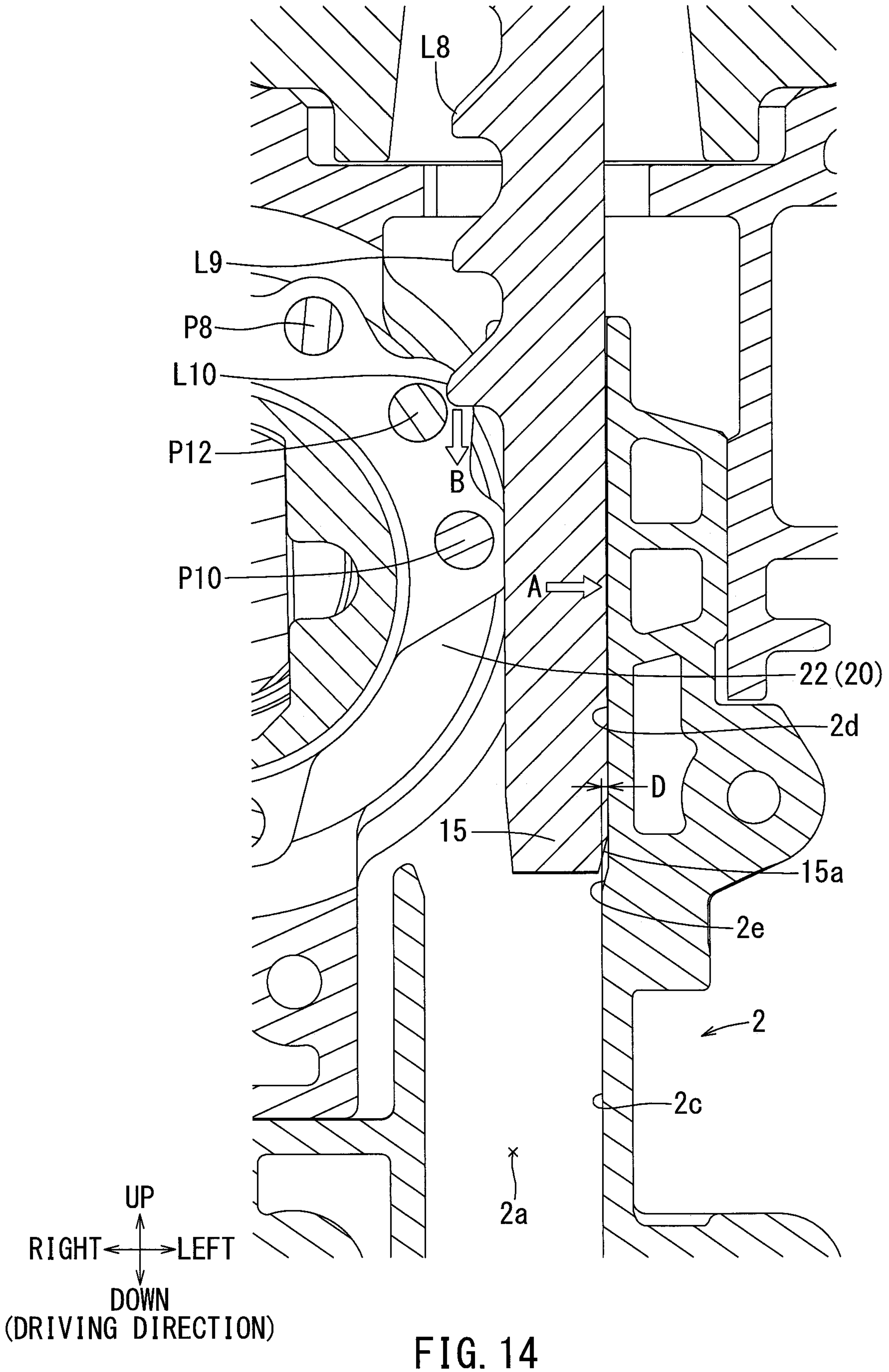
FIG. 14 is an enlarged view of a part XIV of FIG. 13, showing a longitudinal cross-sectional view of a driving passage.

As shown in FIG. 14, the guide surface 2*c* may include a relief (recessed) portion 2*d* at an upper portion of the guide surface 2*c*. The relief portion 2*d* may be recessed by a length D with respect to a main guide surface (an area of the guide surface 2*c* except for an area containing the relief portion 2*d*) in a direction away from the wheel 22. The relief portion 2*d* may extend adjacent to the main guide surface in a direction opposite to the driving direction (in an upward direction).

As shown in FIG. 14, the guide surface 2*c* may include a tilt surface 2*e* that is tilted with respect to the main guide surface and that extends from an upper end of the main guide surface to the relief portion 2*d*. The driver 15 may include a tip end (a lower end portion) that enters the relief portion 2*d*. The tip end of the driver 15 may include a tilt surface 15*a* that is tilted with respect to a moving direction of the driver 15. The tilt surface 15*a* of the driver 15 is on a side of the driver 15 facing the guide surface 2*c*.

In the third embodiment, all engaging portions P of the wheel 22 (the first engaging portion P1 to the eighth engaging portion P8, the ninth engaging portion P12, and the tenth engaging portion P10) may be arranged on the same reference circle C0. Furthermore, all engaging portions P of the wheel 22 may be configured to have the same diameter d1. In the third embodiment, a proper (normal) engagement may be performed when the ninth engaging portion P12 engages a lower surface of the ninth engaged portion L9. With regard to the first engaging portion P1 to the eighth engaging portion P8 and the tenth engaging portion P10, similar to the first and second embodiments, when the engaging portion P engages the engaged portion L assigned with the same number as the engaging portion P, a proper (normal) engagement may be performed. However, in some cases, the engaging portion P does not engage the engaged portion L assigned with the same number to the engaging portion P.

According to the third embodiment, similar to the first and second embodiments, when the driver 15 moves upward in an improper (deviated) engagement state, where the engagement of the engaging portions P of the wheel 22 with the engaged portions L of the driver 15 deviates, the ninth engaging portion P12 may engage a lower surface of the tenth engaged portion L10. When the wheel 22 rotates in a direction indicated by the arrow R with the ninth engaging portion P12 engaging the tenth engaged portion L10, the piston 13 and the driver 15 may move above the standby position toward the upper end position.

When the driver 15 moves upward near to the upper end position in an improper (deviated) state as shown in FIGS. 13 and 14, the tip end of the driver 15 may receive a force from the ninth engaging portion P12, causing the tip end of the driver 15 to enter the relief portion 2*d*. The relief portion 2*d* may be positioned such that when the ninth engaging portion P12 engages an engaged portion L, the tip end of the driver 15 may be pushed toward the relief portion 2*d*. Because of this configuration, the tip end of the driver 15 may move in a direction away from the wheel 22 (in a leftward direction in FIGS. 13 and 14) by a length D of the relief portion 2*d* when the tip end of the driver 15 enters the relief portion 2*d*. By the movement of the driver 15 in a direction away from the wheel 22, the ninth engaging portion P12 may disengaged from the tenth engaged portion L10.

Figure 15:
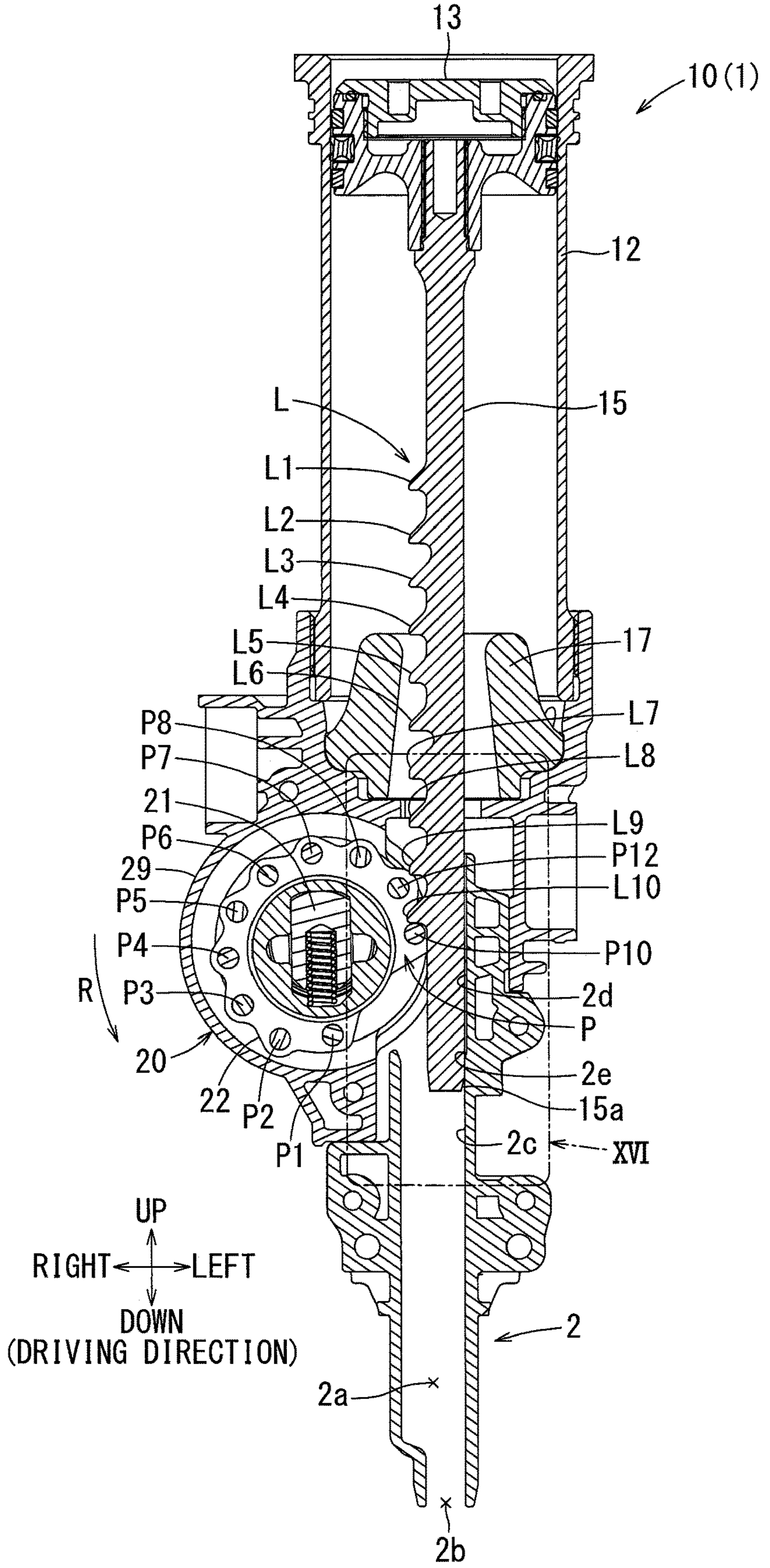
FIG. 15 is a longitudinal cross-sectional view of the lift mechanism according to a third embodiment. This figure shows a state in which the driver is at a standby state.
Figure 16:
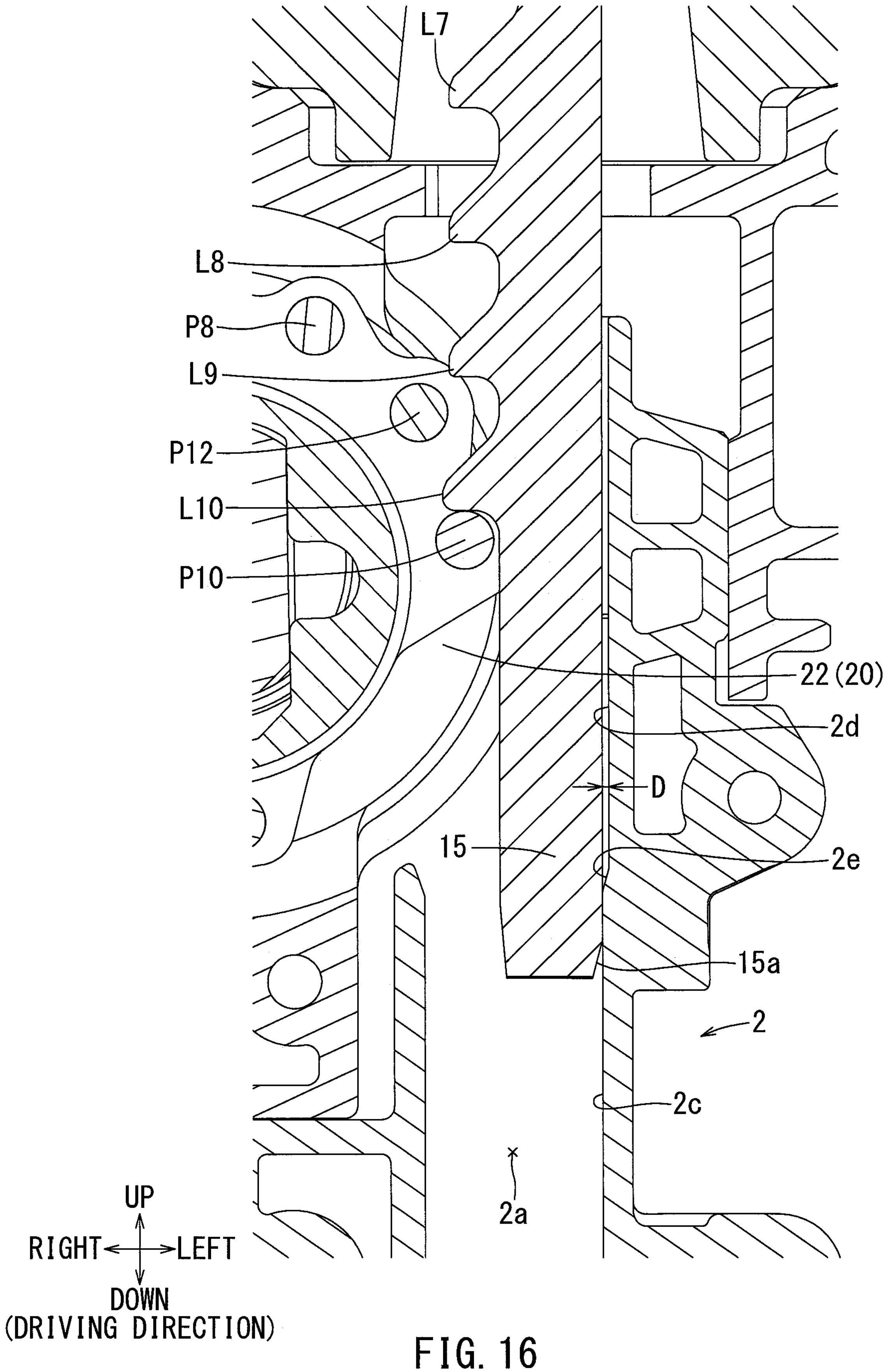
FIG. 16 is an enlarged view of a part XVI of FIG. 15, showing a longitudinal cross-sectional view of the driving passage.

By this disengagement of the ninth engaging portion P12 from the tenth engaged portion L10, the piston 13 and the driver 15, which have been moved near to the upper end position, may slightly move downward as shown in a direction indicated by an arrow B in FIG. 14. By the downward movement of the driver 15 as shown in FIGS. 15 and 16, the tip end of the driver 15 may depart from the relief portion 2*d*, thereby causing the driver 15 to return to the guide surface 2*c* (main guide surface). The tilt surface 2*e* may be formed between the relief portion 2*d* and the main guide surface. The tilt surface 15*a* of the driver 15 may be formed at a corner of the tip end of the driver 15 on a side facing to the relief portion 2*d*. The tip end of the driver 15 may smoothly move downward from the relief portion 2*d* by the driver's 15 tilt surface 15*a* sliding in contact with the tilt surface 2*e* of the guide surface 2*c*, thereby returning the driver 15 to the main guide surface.

When the ninth engaging portion P19 disengages from the tenth engaged portion L10 to cause the driver 15 to move downward, the tenth engaging portion P10 may engage a lower surface of the tenth engaged portion L10. Because of this movement, an improper (abnormal) engagement may be corrected, and the piston 13 and the driver 15 may stop at the standby position. At the standby position, a left side surface of the driver 15 (a side surface on a side opposite to the wheel 22) may depart from the relief portion 2*d*, thereby returning the driver 15 to a state in which the driver 15 slidably contacts the guide surface 2*c* (main guide surface). Because of this movement, the tip end of the driver 15 may return toward the wheel 22 such that the tenth engaging portion P10 engages the tenth engaged portion L10 in a reliable manner. In the third embodiment, similar to the first and second embodiments, a protruding length of the tenth engaged portion L10 in the left-right direction may be configured to be larger than the protruding lengths of the other engaged portions by the length h. Because of this configuration, an engagement of the tenth engaging portion P10 with regard to the tenth engaged portion L10 may be firm, such that the driver 15 may be reliably retained at the standby position.

As discussed above, when the driver 15 moves upward, an improper (abnormal) engagement may be corrected in the third embodiment. Because of this, the engaging portions P of the wheel 22 may correctly engage the engaged portions L when the wheel 22 is in the standby position, and accordingly a next driving operation may be performed in a more stable manner.

The embodiments discussed above may be further modified. For example, the configuration in the first embodiment may be combined with that of the second embodiment. Furthermore, the configuration of the first embodiment or the second embodiment may be combined to a driver displacement mechanism (relief portion 2*d*) of the third embodiment.

Furthermore, in the embodiments discussed above, a cylindrical shaft member may be used for each of the engaging portions P of the wheel 22. However, a configuration of the circumference of the wheel 22 may be formed to have tooth-shaped protrusions serving as the engaging portions P. A diameter of a preceding protrusion with respect to the final protrusion (serving as, for example, the tenth engaging portion P10) may be configured to be smaller, thereby having the same effect as the embodiments discussed above. Alternatively, a preceding protrusion with respect to the final protrusion may be displaced to an inner circumferential side in a radial direction of the wheel 22 in order to obtain the same effect as the embodiments discussed above. When a configuration of the circumference of the wheel 22 is formed to include the tooth-shaped protrusions serving as the engaging portions P, the driver 15 may include cylindrical shaft members serving as the engaged portions L.

Furthermore, ten engaging portions P1-P10 of the wheel 22 and ten engaged portions L1-L10 of the driver 15 may be used in the embodiments discussed above. However, a number of the engaging portions P and the engaged portions L may be modified to adopt the above-discussed engagement correction mechanism.

The driving tool 1 in the first to third embodiments may be one example of the driving tool according to one aspect or other aspects of the present disclosure. The piston 13 in the first to third embodiments may be one example of the piston according to one or other aspects of the present disclosure. The driver 15 in the first to third embodiments may be one example of the driver according to one aspect or other aspects of the present disclosure. The wheel 22 in the first to third embodiments may be one example of the wheel according to one aspect or other aspects of the present disclosure. The engaged portions L in the first to third embodiments may be one example of the engaged portions according to one aspect or other aspects of the present disclosure. The engaging portions P in the first to third embodiments may be one example of the engaging portions according to one aspect or other aspects of the present disclosure.

The outer area E in the first and second embodiments may be one example of the outer area according to one aspect or other aspects of the present disclosure. The tenth engaging portion P10 in the first to third embodiments may be one example of the final engaging portion according to one aspect or other aspects of the present disclosure. The ninth engaging portion P9 in the first embodiment, the ninth engaging portion P11 in the second embodiment, and the ninth engaging portion P12 in the third embodiment may be some examples of the preceding engaging portion with respect to the final engaging portion according to the one aspect or other aspects of the present disclosure.

The guide surface 2*c* in the third embodiment may be one example of a guide surface according to other aspects of the present disclosure. The relief portion 2*d* in the third embodiment may be one example of a relief portion according to other aspects of the present disclosure.

What is claimed is:

1. A driving tool, comprising:
a piston configured to move in a driving direction owing to a pressure of a gas;
a driver configured to drive a driving member by moving integrally with the piston in the driving direction; and
a wheel configured to move the driver in a direction opposite to the driving direction, wherein:
the driver includes a plurality of engaged portions arranged in a longitudinal direction of the driver;
the wheel includes a last engaging portion and a preceding engaging portion preceding the last engaging portion, the preceding engaging portion and the last engaging portion being configured to move the driver in a direction opposite to the driving direction by successively engaging an engaged portion of the plurality of engaged portions as the wheel rotates around a rotation center axis;
the last engaging portion and the preceding engaging portion are formed in a cylindrical shape and extend in a direction parallel to the rotation center axis of the wheel;
the last engaging portion and the preceding engaging portion each includes an outer area positioned further from the rotation center axis of the wheel;
the outer area of the preceding engaging portion is positioned further away from the driver when engaging the engaged portion in comparison to the outer area of the last engaging portion when engaging the engaged portion; and
a center of the preceding engaging portion is nearer to the rotation center axis of the wheel than a center of the last engaging portion.

2. The driving tool according to claim 1, wherein the preceding engaging portion has a smaller diameter than the last engaging portion.

3. The driving tool according to claim 1, wherein:
the plurality of engaged portions of the driver includes a last engaged portion that finally engages the wheel to move the driver upward;
the driver is slidably supported by a guide surface located on a side of the driver opposite to the wheel; and
the guide surface includes a relief portion that allows the driver to move in a direction away from the wheel when the last engaged portion of the driver engages the preceding engaging portion of the wheel.

4. The driving tool according to claim 1, further comprising:
a guide surface configured to slidably support the driver on a side of the driver opposite to the wheel, wherein:
the plurality of engaged portions includes a last engaged portion that finally engages the wheel;
the wheel includes a plurality of engaging portions which are formed in the cylindrical shape and extend in the direction parallel to the rotation center axis of the wheel, the plurality of engaging portions including the last engaging portion and the preceding engaging portion preceding the last engaging portion; and
the guide surface includes a relief portion that allows the driver to move in a direction away from the wheel when the last engaged portion of the driver engages the preceding engaging portion of the wheel.

5. The driving tool according to claim 4, wherein:
the guide surface includes a main guide surface that extends in the driving direction;
the relief portion is above, in the direction opposite to the driving direction, a portion of the main guide surface adjacent to a tip end of the driver when the driver is in a standby position, in which the last engaging portion of the wheel engages the last engaged portion of the driver; and
the relief portion is recessed in a direction away from the wheel in comparison to the main guide surface.

6. The driving tool according to claim 5, wherein the guide surface includes a tilt surface that is tilted with respect to the main guide surface and extends from the main guide surface to the relief surface.

7. The driving tool according to claim 6, wherein:
the tip end of the driver is configured to enter the relief portion; and
the tip end of the driver includes a tilt surface on a side of the driver facing the guide surface, the tilt surface being tilted with respect to the driving direction.

8. The driving tool according to claim 4, wherein:
when the preceding engaging portion of the wheel engages the last engaged portion of the driver, the driver moves to the relief portion to cause the preceding engaging portion to disengage from the last engaged portion, thereby allowing the driver to move from the relief portion in the driving direction to the standby position in which the last engaging portion of the wheel engages the last engaged portion of the driver.

9. The driving tool according to claim 4, wherein:
a length of the last engaged portion that protrudes from a side of the driver toward the wheel is larger than that of the other engaged portions of the plurality of engaged portions.

10. The driving tool according to claim 1, wherein:
the plurality of engaged portions of the driver includes a last engaged portion that finally engages the last engaging portion of the wheel when the driver moves in the direction opposite to the driving direction; and
a length of the last engaged portion that protrudes from a side of the driver toward the wheel is larger than that of the other engaged portions of the plurality of engaged portions.

11. A driving tool, comprising:
a piston configured to move in a driving direction owing to a pressure of a gas;
a driver configured to drive a driving member by moving integrally with the piston in the driving direction along a driving axis; and
a wheel configured to move the driver in a direction opposite to the driving direction, wherein:
the driver includes a plurality of engaged portions arranged in a longitudinal direction of the driver;
the plurality of engaged portions includes a last engaged portion configured to finally engage the wheel as the wheel rotates and a preceding engaged portion configured to engage the wheel before the last engaged portion engages the wheel as the wheel rotates;
the wheel includes a last engaging portion and a preceding engaging portion preceding the last engaging portion which are formed in a cylindrical shape and extend in a direction parallel to an axis of rotation of the wheel, the preceding engaging portion and the last engaging portion being configured to move the driver in a direction opposite to the driving direction by engaging the plurality of engaged portions;

the preceding engaging portion more easily disengages from the last engaged portion than the last engaging portion disengages from the last engaged portion; and a distance between a center of the preceding engaging portion and the axis of rotation of the wheel is smaller than a distance between a center of the last engaging portion and the axis of rotation of the wheel.

12. The driving tool according to claim 11, wherein:

the driver and the wheel are in a standby state when the last engaging portion engages the last engaged portion, and when in the standby state, no portion of the preceding engaging portion directly overlaps the last engaged portion in the driving direction.

13. The driving tool according to claim 12, wherein a rotation angle of the wheel over which the preceding engaging portion engages the last engaged portion is less than a rotation angle of the wheel over which the last engaging portion engages the last engaged portion.

14. The driving tool according to claim 11, wherein, as the wheel rotates, a closest distance between the preceding engaging portion and the driving axis is greater than a closest distance between the last engaging portion and the driving axis.

15. The driving tool according to claim 11, wherein the preceding engaging portion has a diameter smaller than a diameter of the last engaging portion.

16. The driving tool according to claim 11, wherein:

the driver and the wheel are in a standby state when the last engaging portion engages the last engaged portions and when the piston is not moving in the driving direction, when in the standby state, a tip end of the driver is in a first position and is aligned with the driving axis, and the tip end of the driver becomes misaligned with the driving axis when the tip end of the driver is in a second position above the first position in a direction opposite to the driving direction.

17. The driving tool according to claim 16, wherein the tip end of the driver becomes misaligned with the driving axis at the second position by moving away from the wheel in a direction perpendicular to the driving axis.

18. The driving tool according to claim 11, wherein:

the driver is slidably supported by a guide surface located on a side of the driver opposite to the wheel; and the guide surface includes a relief portion that allows the driver to move in a direction away from the wheel when the last engaged portion of the driver engages the preceding engaging portion of the wheel.

19. A driving tool, comprising:

a piston configured to move in a driving direction owing to a pressure of a gas;

a driver configured to drive a driving member by moving integrally with the piston in the driving direction; and a wheel configured to move the driver in a direction opposite to the driving direction, wherein:

the driver includes a plurality of engaged portions arranged in a longitudinal direction of the driver;

the wheel includes a last engaging portion, a first preceding engaging portion preceding the last engaging portion, and a second preceding engaging portion preceding the first preceding engaging portion, the first preceding engaging portion, the second preceding engaging portion, and the last engaging portion being configured to move the driver in a direction opposite to the driving direction by successively engaging an engaged portion of the plurality of engaged portions as the wheel rotates around a rotation center axis;

the first preceding engaging portion, the second preceding engaging portion, and the last engaging portion each includes an outer area positioned further from the rotation center axis of the wheel; and the outer area of the first preceding engaging portion is positioned further away from the driver when engaging the engaged portion than an outer area of the second preceding engaging portion and the last engaging portion when engaging the engaged portion.

* * * * *